United States Patent [19]

Tadmor

[11] 4,142,805
[45] Mar. 6, 1979

[54] METHOD FOR PROCESSING POLYMERIC MATERIAL

[75] Inventor: Zehev Tadmor, Teaneck, N.J.

[73] Assignee: USM Corporation, Farmington, Conn.

[21] Appl. No.: 795,211

[22] Filed: May 11, 1977

Related U.S. Application Data

[63] Continuation-in-part of Ser. No. 654,040, Feb. 2, 1976, abandoned.

[51] Int. Cl.² .......................... B01F 7/10; B29B 1/06; B29B 3/02
[52] U.S. Cl. ...................................... 366/97; 366/307; 425/224; 425/466
[58] Field of Search ...................... 366/52, 69, 97, 136, 366/262–265, 293, 302, 303–307, 315, 336, 337, 340; 425/224, 466; 415/90, 101; 72/60, 262, 270

[56] References Cited

U.S. PATENT DOCUMENTS

| | | | |
|---|---|---|---|
| 3,138,369 | 6/1964 | Bennett et al. | 366/136 |
| 3,308,510 | 3/1967 | Gabbrielli | 425/466 |
| 3,765,216 | 10/1973 | Green | 425/224 |
| 4,041,745 | 8/1977 | Moreau | 425/224 |

Primary Examiner—Harvey C. Hornsby
Assistant Examiner—Timothy F. Simone
Attorney, Agent, or Firm—Benjamin C. Pollard; Richard B. Megley; Vincent A. White

[57] ABSTRACT

Method for processing solid and viscous plastic material or polymeric material and the like in which plastic or polymeric material is fed through an inlet into an enclosed passage of which opposed side walls are moving simultaneously toward an outlet and the material is processed and dragged forward by the moving side walls against a channel block and with progressive build up of pressure along said passage for discharging the processed material through the outlet from the enclosed passage. Rotary apparatus for practicing the method includes one or more annular channels having opposed side walls and carried by a driven rotor member for movement relative to a housing of which an annular surface coaxial with the rotor cooperates with the walls of the channel or channels to form an enclosed annular passage or enclosed annular passages. An inlet for feeding the plastic or polymeric material into each annular passage extends through the housing and an outlet for discharge of material from each passage is disposed circumferentially a major portion of a complete revolution from the inlet. A channel block supported by the housing projects into each channel to hold the plastic or polymeric material for relative movement with respect to the channel side walls and to wipe or scrape the side walls moving past it, and is located between the outlet and the inlet to each annular passage.

16 Claims, 6 Drawing Figures

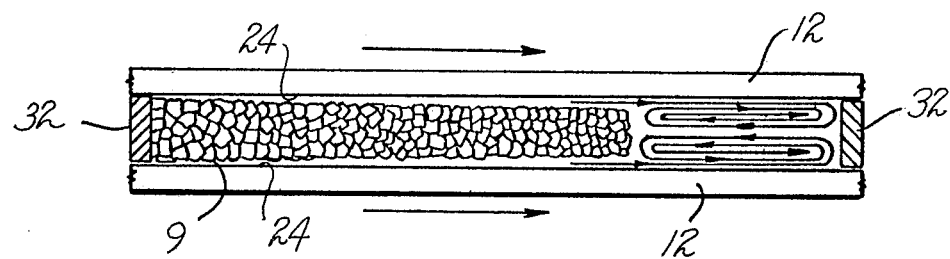
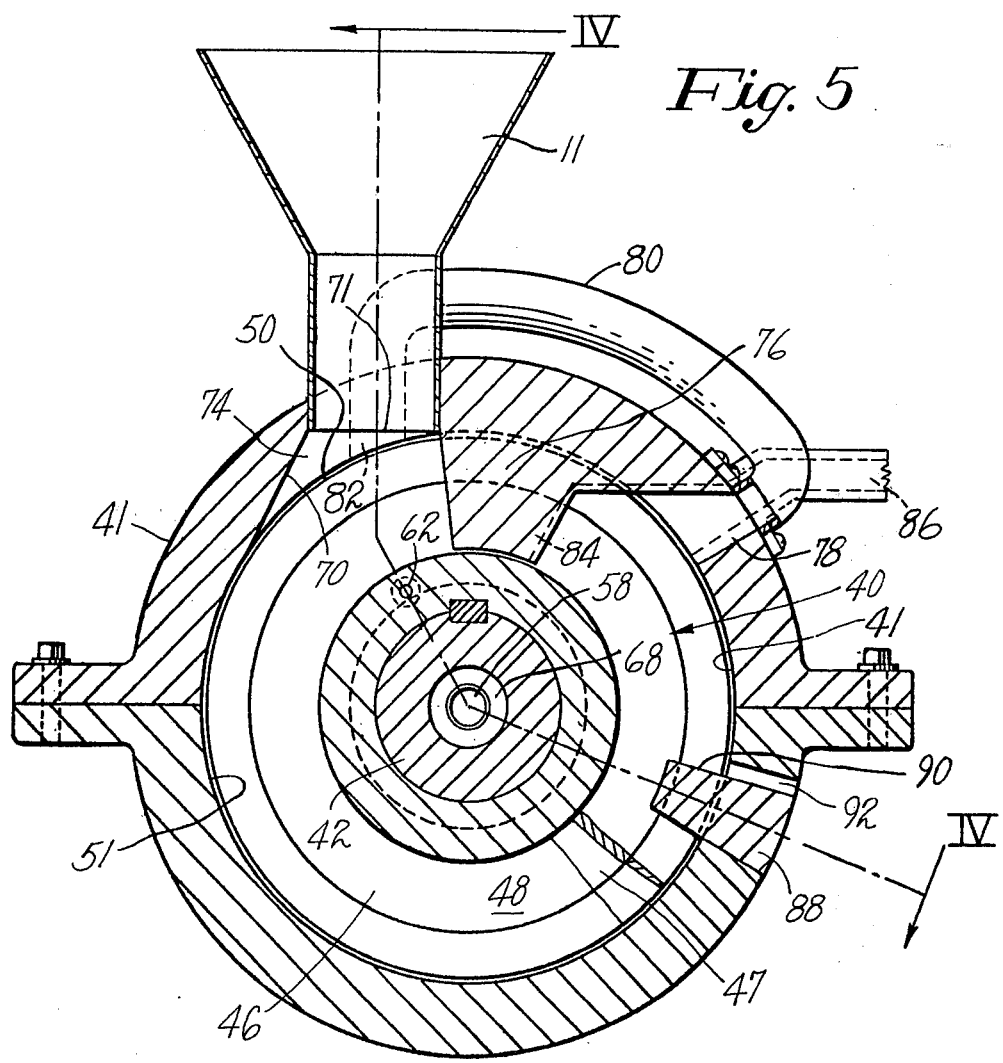

METHOD FOR PROCESSING POLYMERIC MATERIAL

This is a continuation-in-part of my copending application Ser. No. 654,040, filed Feb. 2, 1976, entitled "Rotary Disc Polymer Processor", now abandoned.

FIELD OF THE INVENTION

This invention relates to methods for processing solid and viscous plastic and polymeric materials.

BACKGROUND OF THE INVENTION

The most important machine at the present time for processing plastic and polymeric materials is the single screw extruder. The term processing refers to one or more of the following operations: handling and conveying and pressurizing of particulate solids; melting or plasticating of solid materials; conveying, pressurizing or pumping of liquid or molten materials; mixing blending, dispersing and homogenizing the materials and various liquid or solid additives; devolatilizing the materials; bringing about any microscopic or macroscopic structural change in the materials by chemical reactions such as polymerization, cross-linking and foaming or by other means to modify, alter or improve some property. It is well recognized in the field, that the ordinary screw extruder for processing plastic and polymeric materials is generally modelled as a shallow stationary channel defined by the root of the screw and the flights and a fourth wall defined by the inner surface of the barrel which moves relative to the stationary channel, (see for example Z. Tadmor and I. Klein, "Engineering Principles of Plasticating Extrusion", Van Nostrand Reinhold Book Co., New York, 1970).

The relative rotational movement of the barrel and the extruder screw drags material both in particulate solids and viscous liquid form toward the discharge end of the barrel and toward a screw flight bringing about conveying, pressurization and pumping actions of solids and viscous liquids, and mixing dispersion and homogenization of the viscous liquids. Heat energy from the barrel together with frictional heat generation and viscous heat generation create a relatively thin film of melt on the barrel surface, which is dragged by the said relative motion toward a screw flight where it is scraped off bringing about an efficient melting and plasticating action.

Material on the root of the screw and flights of the screw cannot be scraped off, neither do these walls, which are stationary relative to the processed material, bring about any dragging action toward the discharge end of the barrel to facilitate conveying, pressurization or pumping of the solids and viscous material, nor do they facilitate in the mixing, dispersing and homogenization process. In the screw extruder, therefore, the single surface, that of the barrel, is the sole agent for processing material.

BRIEF SUMMARY OF THE INVENTION

It is an object of the present invention to provide a method for processing plastic and polymeric materials in which the material is processed by two simultaneously moving opposed surfaces operating to drag and process material from an inlet to an outlet for discharge and in which removal of material from the moving surfaces is readily and efficiently achieved.

To this end and in accordance with a feature of the present invention I have provided a method in which plastic or polymeric material is fed to an enclosed passageway which may be an annular channel mounted for rotation in close engagement with a housing which forms with the channel an enclosed passage, and in which a channel block is disposed in the channel to hold material in the channel for movement relative to the channel surface for processing which may be conveying of solids, melting or plasticating, conveying, pumping or pressurizing the molten material, mixing, blending, dispersing and homogenizing the material, devolatilizing and/or bringing about molecular microscopic or macroscopic structural changes by chemical reactions such as polymerization, cross linking and foaming or by other means, to modify, alter or improve some property of the material.

DESCRIPTION OF THE DRAWING

The subject invention will be described in connection with the attached drawings which show two forms useful in the method of the machine of the present invention. In the drawing:

FIG. 3 is a flattened sectional view of a channel taken along a selected radius and illustrating the movement of material within a channel;

FIG. 5 is a sectional end elevational view of the processing machine of FIG. 4 taken along the line V—V of FIG. 4 perpendicular to the axis of rotation of the rotor.

DESCRIPTION OF THE PREFERRED EMBODIMENT

Figure 1:
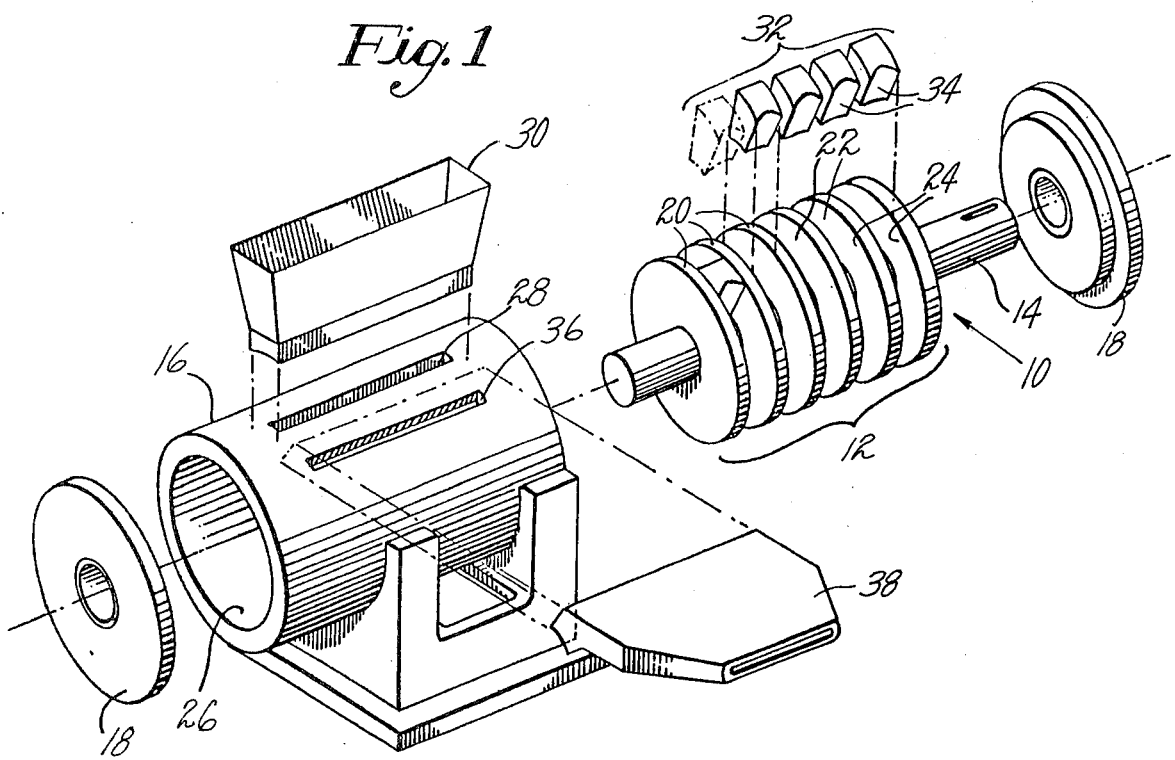
FIG. 1 is a schematic perspective view of the processing machine which is exploded to show the various parts.

The method of the present invention gives the unique advantage that plastic or polymeric material is processed by feeding a body of the material through an inlet to the space between two opposed surfaces and simultaneously moving both surfaces relative to the material in a direction to drag the material from the inlet toward an outlet to process the material and discharge it through the outlet.

Apparatus effective to provide this action (see FIGS. 1 & 2) may comprise a rotor 10 shown as a number of spaced disc-like elements 12 mounted on a drive shaft 14 for rotation within a housing 16, with the shaft 14 journalled in end plates 18 of the housing 16. The rotor 10 is constructed with annular, suitably cylindrical, surface portions 20 and with at least one annular channel 22 formed with spaced opposed side walls 24 disposed with an annular surface portion 20 on each side of the channel. The housing 16 provides an annular, suitably cylindrical surface 26 coaxial with and in close relation to the annular surface portions 20 of the rotor to form with the channel(s) 22 enclosed annular passage(s).

An inlet opening 28 through the housing 16 is provided for introduction of plastic or polymeric material for processing from a suitable feeder, shown as a hopper 30, into the annular channel(s) 22. It will be understood that suitable plastic or polymer feeding devices will be used which may be a simple gravity feed hopper as shown or may be a screw feeder, a ram feeder, a disc-type pre-heater feed and so on depending on the character of the plastic or polymeric material and the difficulty of controlling its supply to the channel(s) 22.

Channel blocks 32 mounted on the housing 16 extend into each channel 22 at a circumferential position at least a major portion of a complete revolution of the rotor 10 from the inlet 28 to provide an end wall 34 to the annular channel 22 and scraper portions in close relation to the walls 24 of the channel. The channel block 32 has a shape complementary to and fitting closely within the channel 22 into which it extends and the end wall facing the annular channel 22 may be radially disposed or at another suitable angle depending upon the material and treatment desired. Adjacent to the channel block 22, upstream from it, i.e. counter to the direction of movement of the channel, an outlet opening 36 through the housing 16 is provided.

In operation of the processor, plastic or polymeric material in solid or liquid state is fed by the feeding device which distributes the material into each channel 22 through the inlet 28. As the rotor 10 turns, the main body of material is held by the end wall 34 of the channel block 32 so that the channel side walls 24 move relative to the body of material and the material adjacent the opposed side walls 24 of the channel 22 is dragged forward by the side walls toward the end wall 34 of the channel block 32 with a gradual buildup of pressure reaching a maximum value at channel block 32 where it is discharged. The melting mechanism is schematically shown in FIG. 3 where the material is a granular solid. As shown, the granules are compacted into a solid bed as a result of the relative motion between the rotating side walls 24 of the channel 22 and the solids within the channel. Optionally, the channel walls 24 may be preheated, but in any case, the relative movement generates frictional heat and forms a film of molten plastic or polymeric material on the side walls 24 of the channel. The molten film thus formed, moves with the walls 24 and is vigorously sheared by motion relative to the main body of plastic or polymeric material in the channel to generate further heat by viscous dissipation. The action of the side walls 24 of the channel 22 in dragging forward material on its surface builds up pressure progressively along the length of travel of the side walls reaching a maximum value at the channel block 32. The channel block 32 scrapes off and collects viscous liquid material carried forward by the side walls of the channel and this material accumulates as a pool against the end wall of the channel block and may be discharged from the channel by the built up pressure.

As shown schematically in FIG. 3, continued supply of material dragged foward by the channel walls produces a strong circulatory motion in the pool of molten material and this circulatory motion gives a vigorous mixing action. Similar vigorous mixing action can be achieved with liquid fed material by appropriate selection of operational controls.

Figure 2:
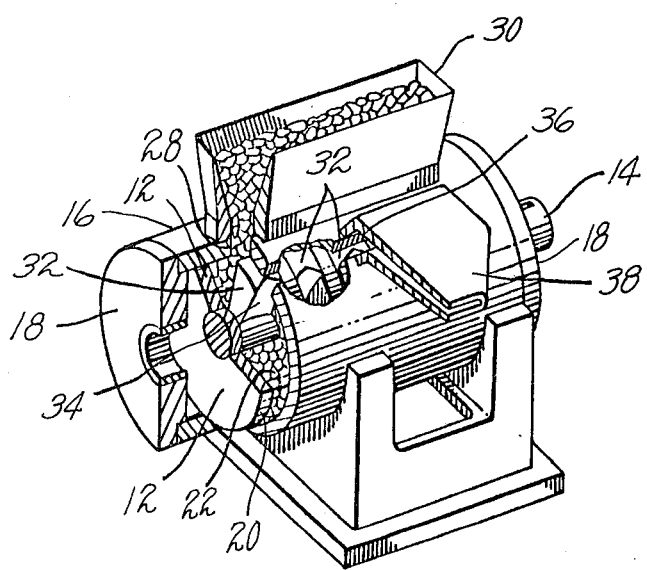
FIG. 2 is a perspective view partially in section of the processing machine of FIG. 1.

In the treatment of polymeric and plastic materials having similar characteristics, such as material normally processed in screw type extruders and which are, or become in the course of processing, high viscosity liquids, coordination of physical design factors and operational controls in the present machine and method enables processing, that is conveying and pressurization of solids; melting or plasticating of solids materials; conveying, pressurizing or pumping of liquid or molten material; mixing, blending, dispersing and homogenizing the material, devolatilization and combination of these process treatments, in relation to solid material feed and viscous material feed or combinations of both. The method and machine can feed various shaping dies such as sheeting and profile dies, cross head dies, cable and wire coating dies, pelletizers, and many other sequentially arranged processing apparatus. As shown in FIGS. 1 and 2, such a die 38 may be disposed directly in the outlet opening 36 of the machine.

Further, the method and machine can be used to bring about microscopic or macroscopic structural changes in the material to modify, alter or improve some property of the material, by chemical reaction such as polymerization of prepolymers and monomers leading to viscous polymeric liquids, cross-linking, chain break down, foaming and the like.

Machine design factor variables include the geometry of the annular channel(s), the nature of the feeding device, the dimensions and location of the opening(s), the shape of the channel block(s), and the dimension(s) and location(s) of the outlet opening(s).

The geometry of the channel 22 must achieve a balance of the various purposes which the channel serves. Since the channel walls 24 are a primary processing member, a narrow and deep channel 22 will be used in which the depth of the channel is at least as great and preferably a plurality of times as great as the width of the channel. The cross section of the channel must be of appropriate shape and the space between opposed side walls 24 must be sufficiently wide to enable material fed to it to reach the root of the channel and fill the channel directly; but a balancing factor is that the pumping or pressurizing ability of the channel 22 be maintained close to the optimum and not be made so wide as to decrease the pressurizing ability. Melting, mixing and pumping or pressurizing action increases as the rate of passage of channel walls area past the material increases; but the ratio of channel wall area to channel volume must be balanced so that where solid material is fed to the channel it will fill a portion of the channel for melting at a desired rate by the action of the channel walls and that the molten material will fill a portion of the channel sufficient to produce desired mixing and pumping or pressurizing of the material for discharge. The linear speed of portions of the channel walls at a given rate of rotation increases directly as the radial distance of each wall portion from the axis of rotation and it has been found that the variation in processing action due to difference in radial distance from the axis may be compensated by increasing the space, H, between channel walls in proportion to the distance, R, from the axis so that H/R is a constant. A simple arrangement would involve forming the channel walls as spaced truncated cones of which the vertices would substantially coincide at the axis of rotation.

Channels such as formed by opposed faces 24 of discs 12 mounted adjustably in spaced relation on a drive shaft 14 as in FIG. 1 will operate to process polymer materials, and this construction has advantages for experimental analysis of processing of various viscous and solid materials.

That is, the space between opposed faces of the discs is readily altered by use of different spacers and the depths of the channels defined by the opposed faces can be altered by use of annular spacers having different diameters. The number of channels may be altered by removing or adding discs to enable operation with different material, different energy input, different processing rates and so on through selection of dimension for on-line operation. By reason of the straightforward relations in the present machine and method, data derived from machines constructed with rectangular cross section channels formed by discs may be transferred to more sophisticated machines with a good measure of confidence. Also, the discs may be of any shape or cross sections and need not necessarily be flat. Wedge shaped or fin shaped discs may be useful for certain functions. Alternatively, the channels may be annular grooves or passageways formed in a driven rotor.

The feeder for introduction of plastic or polymeric material or the like to the processing channel is designed for operation with the particular material and state of the material to be processed. Where the plastic or polymeric material to be processed is granular, the feeder will be designed to insure filling the channels from bottom to top for effective use of the processing surfaces of the channel. A simple hopper leading through the inlet opening may be useful with some granular materials while with others it may be important to have mechanical feed such as a screw or ram type feed. Where the material to be processed is a viscous liquid, the feeder may be a conduit through which the liquid flows to the channel or may be a pump such as a screw type or gear type device for supplying material at a desired rate and pressure.

The outlet opening 36 through the housing 16 is disposed at least a major portion of a complete revolution of the rotor 10 from the inlet opening 28 in a position to receive and discharge processed material reaching the channel block 32. Control of the rate at which processed material is allowed to discharge from the channel is an important factor in determining the extent to which the material is processed and the outlet 36 is constructed and arranged to provide this discharge control. Control may be effected by the size of the opening or by a throttling valve or other device in the discharge outlet. The discharge rate may also be controlled by connecting the outlet opening to a further processing stage such as an extrusion nozzle or die 38 or the like which may provide desired flow resistance controlling the rate of discharge from the outlet and the extent of processing of material in the channel. In a modification, in a processing device according to the present invention having more than one channel, the outlet from one channel may be lead through a conduit to the inlet of a further channel for further processing. This arrangement is particularly valuable since the series pressure-producing and pumping action of successive processing channels is cumulative so that high outlet pressure is readily secured. It will be understood that successive channels may each have different geometry from other channels for best processing of material supplied to it. Also, material processed in and discharged from one channel or a given number of channels operating in parallel may be fed to one channel or to any suitable number of channels operating in parallel.

Separate feeders and inlet openings may be provided to feed each channel or any combination of channels with polymeric or plastic material which may be the same as or different from the material fed to any other channel or combination of channels. Different materials processed by separate channels or combinations of channels may be discharged through separate outlet openings and may be supplied to separate extrusion nozzles or, may be fed to a nozzle for co-extrusion, for example with one material as a core and another material as a coating.

Effective processing of plastic or polymeric material by the method of the present invention is achieved by coordinating the rate of feed and discharge of material to the processing channel(s), temperature control and speed of the channel walls with respect to the properties of the material and the geometry of the channel.

Materials which may be processed by the method and machine of the present invention include all plastic materials and polymeric materials normally liquid or reducible by heat or mechanical energy, or diluent to viscous liquid or deformable state, processing and which have sufficient stability to avoid serious degradation under treatment conditions. Such materials include but are not limited to thermoplastic, thermosetting and elastomeric polymeric materials such as for example, polyolefins (e.g. polyethylenes, polypropylenes), vinylchloride polymers (e.g. polyvinylchloride), fluorine containing polymers, polyvinylacetate based polymers, acrylic based polymers, styrene based polymers (e.g. polystyrene), polyamides (e.g. nylons), polyacetals, polycarbonates, cellulose based plastics, polyesters, polyurethanes, phenolic and amino plastics, epoxy based resins, silicone and inorganic polymers, polysulphone based polymers, various natural based polymers and the like together with copolymers and blends of those materials with each other or with solvents or diluents or with different solid and liquid additives. Also, it is contemplated that chemically reactive materials such as materials or mixtures of materials which may form polymers which are viscous liquids at some stage of their formation, and at the temperatures maintained in the channel(s) may be fed to the machine for reaction and processing in the channel(s).

Temperature of the material as supplied and during the course of processing in the machine will be controlled so that the viscosities and flow characteristics of the material being processed are determinable.

The inter-relationship of rate of feed and discharge of liquid viscous plastic and polymeric materials, to an annular rectangular processing channel and the speed of the channel walls with respect to the properties of the selected material and temperature and to the geometry of the channel, assuming: isothermal, laminar, steady, fully developed flow of an incompressible power law model non-Newtonian fluid, neglecting gravitational and inertial (centrifugal) forces is expressed by the following equation:

$$Q = \pi N H R_d^2 (1 - \alpha^2) - \left( \frac{H^{s+2} R_d^{1-s}(\alpha^{1-s} - 1)}{2^{s+1}(s-1)(2+s)m^s} \right) \left( \frac{dP}{d\theta} \right)^s$$

In the above equation:
 Q = volumetric flow rate (in$^3$/sec.)
 N = frequency of channel rotation (r.p.s.)
 $R_d$ = outside radius of annular channel (in.)
 $R_s$ = inside radius of annular channel (in.)
 $\alpha = R_s/R_d$
 H = width of annular channel
 P = pressure (psi)
 $\theta$ = angle (radians)

$$\frac{dP}{d\theta} = \frac{Pout - Pin}{2\pi\phi} = \text{angular pressure gradient (psi/rad.)}$$

Pout = exit presure (psi)
Pin = inlet pressure (psi)
$\phi$ = fraction of circumference from inlet to outlet.
s = 1/n empirical parameter of the 'power-law' model fluid:

$$\eta = m\,\dot{\gamma}^{n-1}$$

$\eta$ = non-Newtonian viscosity ($lb_f sec/in^2$)
m = empirical parameter ($lb_f sec^n/in^2$)
n = empirical parameter
$\dot{\gamma}$ = shear rate, (1/sec)

In the above equation the first term on the right-hand side is the 'drag flow' and the second term is the 'pressure' flow. This equation also applies for Newtonian fluids in which s=n=1 and m=$\mu$ is the Newtonian viscosity.

As illustration to the use of the above equation a melt pump for polymeric material will be designed. It is required to pump 1,000 lbs/hr melt and generate a 1500 psi pressure at the discharge. The power-law parameters of this melt at the processing temperature are m = 1 $lb_f sec^{0.5}/in^2$ and n = 0.5. Assuming $P_{in}$ = 0 and $\phi$ = 0.75, the required gradient is $$\frac{dP}{d\theta} = \frac{1500}{(2)(\pi)(0.75)} = 318.3 \text{ psi/rad}$$

Further assuming that the density of this melt at the processing temperature and the average pressure is 50 lb./ft.$^3$, the volumetric flow rate is $$Q = \frac{(1000)(1728)}{(3600)(50)} = 9.6 \text{ in}^3/\text{sec}$$

Substitution of the available date into the design equation with $\alpha$ = 0.5 gives $$9.6 = 2.356 N(\text{r.p.s.}) H(\text{in}) R_d^2(\text{in}^2) - \frac{3166.1(\text{sec}^{-1}) H^4(\text{in}^4)}{R_d(\text{in})}$$

Figure 6:
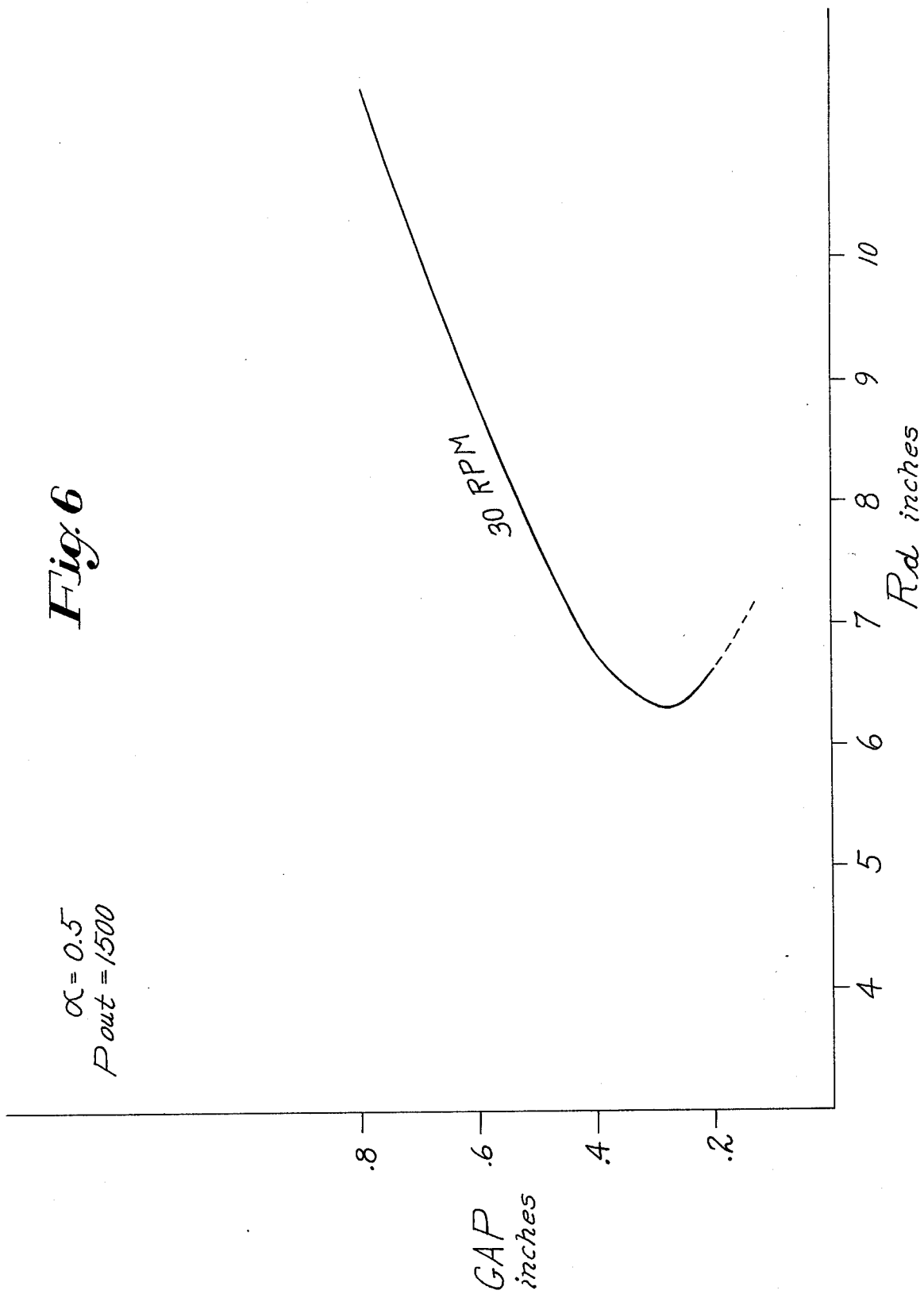
FIG. 6 is a graph on which are plotted the relationship of channel width and channel diameter for given operating conditions.

The above equation provides the required relationship between $R_d$, H and N. Next by selecting a reasonable N value e.g. 30 RPM, the relationship between $R_d$ and H is obtained as shown in FIG. 6. Thus, a disc radius of 6.3" is the optimum with a channel width of 0.24". Therefore, an annular rectangular channel of outside diameter of 12.6", inside diameter of 6.3" and width of 0.24" rotating at 30 r.p.m. pumps 1,000 lb./hr. melt and generates 1,500 psi, pressure.

It is observed that the annular channel is narrow and deep and this may pose difficulties in effectively feeding material to be treated in a manner to reach the bottom of the channel. In practice, this problem can be solved either by providing sufficient undercut in the housing as shown in FIG. 5 undercut 70 is provided in housing 41 or using a plurality of channels with the first stage somewhat wider than the optimum.

By way of illustration, where the material to be fed is particulate solid material, it is preferred to have a first channel as narrow as possible, but suitably wide for gravitational feeding. For common polymeric materials in particulate form, this is of the order of about 0.25" to about 2.5".

For practical considerations, the speed of the rotor and channel will generally not exceed 500 RPM and desirably will not exceed about 250 RPM. Lower limits of rotor and channel speed may be as low as about 10 RPM.

Figure 4:
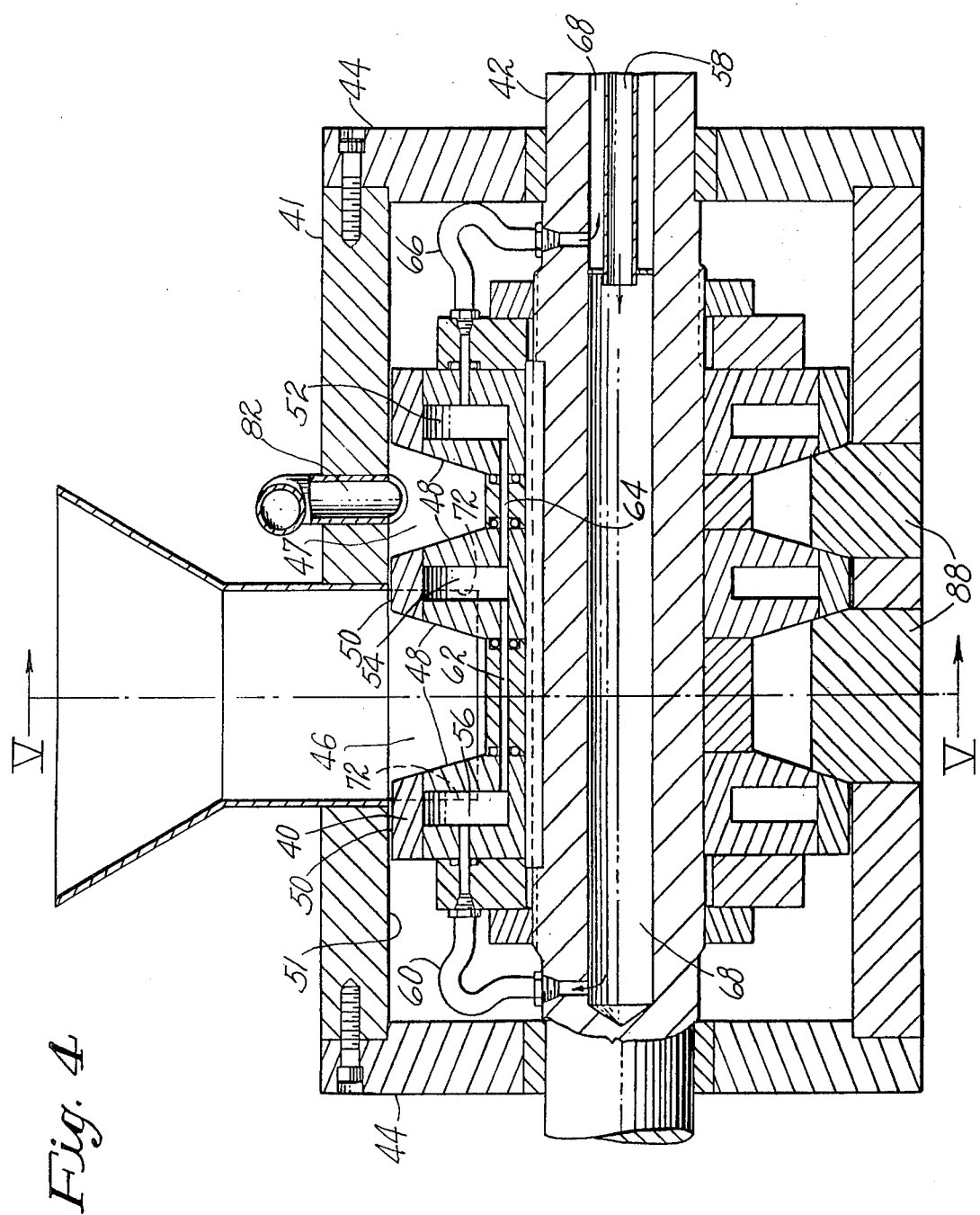
FIG. 4 is a sectional elevational view of a second form of the processing machine taken on the line of IV—IV of FIG. 5 parallel to and along the axis of rotation of the rotor of the processing machine.

A further embodiment of the invention is shown in FIGS. 4 and 5 in which is provided an improved structure in which two processing channels are connected in series. In this machine, a rotor 40 is mounted for rotation in housing 41 on a drive shaft 42 journalled in end walls 44 of the housing 41. Annular channels 46 and 47 are provided with the opposed side walls 48 in fixed relation to each other providing a wedge shaped channel cross section and with relatively wide cylindrical surface portions 50 at each side of the channels 46 and 47. These cylindrical surface portions 50 are in close sliding fit with the coaxial cylindrical inner surface 51 of the housing 41 so that the inner surface 51 and the channels 46 and 47 form enclosed annular passages.

Chambers 52, 54 and 56 are provided on the outside of each of the walls 48 of the channels for introduction of a temperature control fluid for heat transfer through the walls of the channel. Heat transfer fluid is supplied to these chambers through an axial passage 58 constructed in the shaft 42 through which temperature control fluid flows to a first chamber 56 through the tube 60, from the first chamber 56 through a channel 62 to the second chamber 54, then through a channel 64 to the third chamber 52 and through a tube 66 to a further passageway 68 in the shaft 42.

As shown more clearly in FIG. 5, the interior surface 51 of the housing 41 is cylindrical over most of its extent but is provided with an undercut 70 adjacent the material inlet opening 71 to channel 46. This undercut 70 is of a width such that its walls 72 extend out over the cylindrical portions 50 of the rotor 40 to form an intake chamber 74 so that when viscous liquid material is supplied through the inlet opening 71, the viscous liquid material is dragged by the cylindrical surface 50 of the rotor to the nip where the surface of the walls 72 of the undercut 70 approaches the cylindrical surface 50 of the rotor. This action facilitates squeezing of the viscous material into the channel 46.

Channel block 76 mounted on the housing 41 has a shape complementary to and fitting closely within the channel 46 to hold the main body of plastic or polymeric material for motion relative to the walls 48 of channel 46 and to scrape off viscous liquid material carried forward by the walls 48 for discharge as processed material through outlet 78. A passageway 80 is provided to conduct processed material from outlet 78 to the inlet 82 into annular channel 47 for further processing. Channel block 84 mounted on the housing 41 has a shape complementary to and fitting closely within channel 47 to hold the main body of plastic or polymeric material in that channel for motion relative to the walls 48 and to scrape off viscous liquid material carried forward by the walls 48 for discharge as processed material through outlet 86.

Referring to FIG. 5, the provision of an optional further mixing structure 88 is shown. This structure 88 will extend part way into the channels and by its action on the material in the channels 46 and 47 increases the shear on the material being processed and improves the mixing action of the machine. The mixing structure 88 can be constructed in a variety of uses and shapes, for example pegs, wedges or blocks of a shape and size to provide clearances with the walls of the channel, screens, static mixing devices and so on. By moving in and out a wedge shaped mixing block to vary the clearance to the channel walls and an adjustable extent of mixing is obtained. In the form shown, the structure is a dam which will create a void of material on its forward face 90, the forward and rear face being defined relative to the direction of travel of the rotor channel 46. This void may be used to vent the channel 46 by inserting a port 92 in the housing 41 at the forward face of the dam 88 to allow any material volatilized to escape. The port 92 may also be used as an inlet for processing additives.

Alternatively, the channel block itself can serve as a mixing block by allowing a certain clearance, which can be varied by moving the channel block in and out, and consequently recycling some or all of the material. If all material is recycled, batch operation is obtained. In part of the material is recycled, continuous operation is obtained.

By use of these options a variety of procedures may be carried out. Thus, the channel block may be set for recycling some or all of the material to bring material in the channel to a selected condition, further material may then be added either through inlet opening 71 or through port 92 or both for mixing or combination with the material which has been brought to the selected condition in the channel.

The following Example is given as of assistance in understanding the invention and it is to be understood that the invention is not restricted to the particular procedures, proportions, materials, temperatures or other details of the process.

EXAMPLE

A processor as shown in FIG. 1 was set up with a rotor having a channel gap width of 0.25" and an outside diameter of 7.5" and inside diameter of 4.5". The inlet to the housing of the processor was connected by a conduit to receive molten low density polyethylene from a screw extruder, and the outlet from the housing was connected to a restricted orifice. The following results were obtained:

| Rotor Speed (r.p.m.) | Material Flow (lb./hr.) | Pressure Rise over Processor (Pout-Pin) (psi) | Channel wall temp. (° F.) | Material Temp. in (° F.) | Material Temp. out (° F.) |
|---|---|---|---|---|---|
| 21 | 183.5 | 490 | 400 | 410 | 424 |
| 21 | 141.0 | 870 | 300 | 420 | 396 |
| 19 | 64.2 | 1275 | 300 | 420 | 396 |
| 55.5 | 279 | 1510 | 300 | 420 | 423 |
| 73.5 | 275 | 1705 | 300 | 418 | 423 |

A further example comprises the same processor with a channel width of 0.75" gravitationally fed by solid low density polyethylene pellets:

| Rotor Speed (r.p.m.) | Channel wall temp. (° F.) | Rate of Plasticating lb./hr. | Discharge Temp. (° F.) |
|---|---|---|---|
| 26.6 | 400 | 23.3 | 348 |
| 75.5 | 400 | 46.2 | 368 |
| 153.6 | 400 | 79.2 | 408 |

Having thus described my invention, what I claim as new and desire to secure by Letters Patent of the United States is:

1. In the method of processing of plastic and polymeric materials which are, or become in the course of processing, viscous liquids including the steps of dragging the material by one wall relative to another for processing and discharge, the improvement which comprises introducing said material at a feed point into a channel between opposed walls moving simultaneously toward a discharge point, retaining said material in said channel by a surface, blocking said channel adjacent said discharge point to restrain the main body of said material from movement with said walls to create relative movement between the main body of said material and said walls, dragging forward viscous liquid portions of said material in contact with said walls and collecting said viscous liquid portions as a pool of viscous liquid against said blocking for processing and discharge, and coordinating the rate of discharge of material from said channel with the surface area and the rate of movement of said opposed walls relative to said main body of material and with the properties of said material to develop pressure in said pool and to effect the desired processing.

2. The method of processing plastic and polymeric materials as defined in claim 1 in which said channel and said material retaining surface are annular and coaxial.

3. The method of processing plastic and polymeric materials as defined in claim 2 in which the rate of movement of said walls relative to said main body of material is within the range giving laminar flow to liquid material in said channel.

4. The method of processing plastic and polymeric materials as defined in claim 3 in which a mixing structure is disposed in said channel at a location intermediate said feed point and said discharge point to give additional mixing action.

5. The method of processing plastic and polymeric materials as defined in claim 4 in which said mixing structure is a dam projecting across a portion of the cross section of said channel and in which gases and vapors are removed or agents added to material in said channel closely forward of said dam.

6. The method of processing plastic and polymeric materials as defined in claim 3 in which said blocking allows passage of a portion of the material on said walls for further passage through and processing in said annular channel.

7. The method of processing plastic and polymeric materials as defined in claim 6 in which discharge of material from said outlet is cut off for batch processing a charge of material in said channel and discharge is resumed when processing of said charge is achieved.

8. The method of processing plastic and polymeric materials as defined in claim 3 in which material from the discharge of one processing channel is conducted to the feed point of a further processing channel for further processing and discharge from said further processing channel.

9. The method of processing plastic and polymeric materials as defined in claim 3 in which said material is in the form of solid particles and is supplied in a manner substantially to fill said annular channel and in which the temperature at which said material is supplied and the temperature of said opposed side walls is controlled to effect melting of portions of said material contacting said side walls.

10. The method of processing plastic and polymeric materials as defined in claim 3 in which said material is supplied as a viscous liquid and is fed through said inlet under conditions substantially to fill said annular passage.

11. The method of processing plastic and polymeric materials as defined in claim 10 in which said material is fed through said inlet to an intake chamber including a surface sloping toward a cylindrical surface at an outer edge of and rotating with said annular channel and is dragged by said cylindrical surface into the nip between said sloping surface and said cylindrical surface for improved feeding of said material into said annular channel.

12. The method of processing plastic and polymeric material as defined in claim 2 in which said annular channel rotates at a frequency of rotation from about 10 to about 500 r.p.m.

13. The method of processing plastic and polymeric materials as defined in claim 2 in which a material or mixture of materials reactive to form a viscous liquid plastic or polymeric material is introduced into said channel and the temperature, pressure, rate of discharge of material from said channel, rate of movement, and surface area of said opposed walls are coordinated to effect processing.

14. The method of processing plastic and polymeric material as defined in claim 13 in which a component of a mixture of materials reactive to form a viscous liquid plastic or polymeric material is introduced into said channel intermediate said feed point and said discharge point for mixing and interaction with materials in said channel.

15. The method of processing plastic and polymeric materials as defined in claim 5 in which a material or mixture of materials reactive to form a viscous liquid plastic or polymeric material is fed through said inlet into said channel and the temperature, pressure, rate of discharge of material from said channel, rate of movement, and surface area of said opposed walls are coordinated to effect processing.

16. The method of processing plastic and polymeric material as defined in claim 15 in which a component of a mixture of materials reactive to form a viscous liquid plastic or polymeric material is introduced into said channel intermediate said feed point and said discharge point for mixing and interaction with materials in said channel.

* * * * *

UNITED STATES PATENT OFFICE
CERTIFICATE OF CORRECTION

Patent No. 4,142,805      Dated March 6, 1979

Inventor(s) Zehev Tadmor

It is certified that error appears in the above-identified patent and that said Letters Patent are hereby corrected as shown below:

On the cover sheet, item 73, Assignee: delete - USM Corporation, Farmington, Conn. -

*Signed and Sealed this*

*Twenty-ninth* Day of *May 1979*

[SEAL]

Attest:

RUTH C. MASON
*Attesting Officer*

DONALD W. BANNER
*Commissioner of Patents and Trademarks*